US012801254B2

(12) United States Patent
Yang et al.

(10) Patent No.: US 12,801,254 B2
(45) Date of Patent: Nov. 17, 2026

(54) CONTROL METHOD OF DISPLAY WINDOW, ELECTRONIC APPARATUS AND STORAGE MEDIUM

(71) Applicant: BEIJING XIAOMI MOBILE SOFTWARE CO., LTD., Beijing (CN)

(72) Inventors: Huiying Yang, Beijing (CN); Jiayan Li, Beijing (CN); Siqi Li, Beijing (CN); Leilei Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 160 days.

(21) Appl. No.: 18/417,837

(22) Filed: Jan. 19, 2024

(65) Prior Publication Data

US 2025/0053281 A1 Feb. 13, 2025

(30) Foreign Application Priority Data

Aug. 11, 2023 (CN) ......................... 202311016332.4

(51) Int. Cl.
*G06F 3/0481* (2022.01)
*G06F 3/0484* (2022.01)
(Continued)

(52) U.S. Cl.
CPC .......... *G06F 3/0481* (2013.01); *G06F 3/0484* (2013.01); *G06F 3/04842* (2013.01);
(Continued)

(58) Field of Classification Search
CPC ...... G06F 3/0484; G06F 9/451; G06F 3/0481; G06F 3/0482; G06F 3/04842;
(Continued)

(56) References Cited

U.S. PATENT DOCUMENTS 9,471,201 B1 * 10/2016 Truong ............... G06F 3/04883
10,552,031 B2 * 2/2020 Vranjes ................ G06F 1/1669
(Continued)

FOREIGN PATENT DOCUMENTS

WO WO 2017113154 A1 7/2017
WO WO 2022184173 A1 9/2022
WO WO 2023010903 A1 2/2023

OTHER PUBLICATIONS

European Patent Application No. 24155462.5, Search Report dated Jul. 9, 2024, 8 pages.
(Continued)

*Primary Examiner* — Nicholas Ulrich
(74) *Attorney, Agent, or Firm* — Cozen O'Connor

(57) ABSTRACT

A control method includes: in case that a first operation is received, determining an operation object and an operation type of the first operation, a first window information of a first window currently displayed on a display interface and a current display mode of an electronic apparatus; in case that the current display mode is a first mode, determining a second window to be displayed on the display interface after the first operation and a second window information based on at least one of the first window information, the operation object and the operation type; and displaying the second window based on the second window information.

8 Claims, 10 Drawing Sheets

(51) Int. Cl.

| | |
|---|---|
| ***G06F 3/04842*** | (2022.01) |
| ***G06F 3/0486*** | (2013.01) |
| ***G06F 3/04883*** | (2022.01) |
| ***G06F 3/0489*** | (2022.01) |
| ***G06F 9/451*** | (2018.01) |

(52) U.S. Cl.
CPC ........ *G06F 3/0486* (2013.01); *G06F 3/04883* (2013.01); *G06F 3/0489* (2013.01); *G06F 9/451* (2018.02)

(58) Field of Classification Search
CPC .. G06F 3/0485; G06F 3/0486; G06F 3/04883; G06F 3/04886; G06F 3/0489; G06F 2203/04803; G06F 2203/04808
See application file for complete search history.

(56) References Cited

U.S. PATENT DOCUMENTS

| | | | | |
|---|---|---|---|---|
| 2006/0161847 | A1* | 7/2006 | Holecek | G06F 3/0481 715/838 |
| 2016/0162157 | A1* | 6/2016 | Liang | G06F 3/0482 715/765 |
| 2020/0326820 | A1 | 10/2020 | Walkin et al. | |
| 2024/0211282 | A1* | 6/2024 | Zhang | G06F 9/4856 |

OTHER PUBLICATIONS

European Patent Application No. 24155462.5 Search Report dated Jun. 18, 2026, 8 pages.

* cited by examiner

Avoid window when adding widgets to desktop

Avoid when opening folder on desktop

CONTROL METHOD OF DISPLAY WINDOW, ELECTRONIC APPARATUS AND STORAGE MEDIUM

CROSS-REFERENCE TO RELATED APPLICATION

This application is based on and claims priority to Chinese Patent Application No. 202311016332.4 filed on Aug. 11, 2023, the entire contents of which are incorporated herein by reference for all purposes.

BACKGROUND

With the continuous development of the electronic apparatus, there are more and more applications are being installed on user terminals, and the number of linkages between different applications becomes very common. Therefore, it is necessary to realize the combined use and switching display of a plurality of applications in the electronic apparatus.

In the related art, the operations of the combined use and switching display of the plurality of applications in the electronic apparatus are complicated, which will lead to a poor user operation experience.

SUMMARY

The present disclosure relates to a field of electronic apparatuses, and more particularly to a control method of a display window, an electronic apparatus and a storage medium.

Embodiments of a first aspect of the present disclosure provide a control method of a display window, which includes: in case that a first operation is received, determining an operation object and an operation type of the first operation, a first window information of a first window currently displayed on a display interface and a current display mode of an electronic apparatus; in case that the current display mode is a first mode, determining a second window to be displayed on the display interface after the first operation and a second window information based on at least one of the first window information, the operation object and the operation type; and displaying the second window based on the second window information.

Embodiments of a second aspect of the present disclosure propose an electronic apparatus, which includes: a processor; and a memory for storing instructions executable by the processor. The processor is configured to execute instructions to realize the control method of the display window according to the first aspect of the present disclosure.

Embodiments of a third aspect of the present disclosure propose a computer-readable storage medium, which enables an electronic apparatus to execute the control method of the display window according to the first aspect of the present disclosure, in case that instructions in the computer-readable storage medium are executed by a processor of the electronic apparatus.

Additional aspect and advantages of the present disclosure will be set forth in part in the description which follows, and in part will be apparent from the description which follows, or may be learned by practice of the present disclosure.

BRIEF DESCRIPTION OF THE DRAWINGS

The above and/or additional aspects and advantages of the present disclosure will be apparent and easily understood from the following description of embodiments with reference to the accompanying drawings, in which.

DETAILED DESCRIPTION

Figure 1:
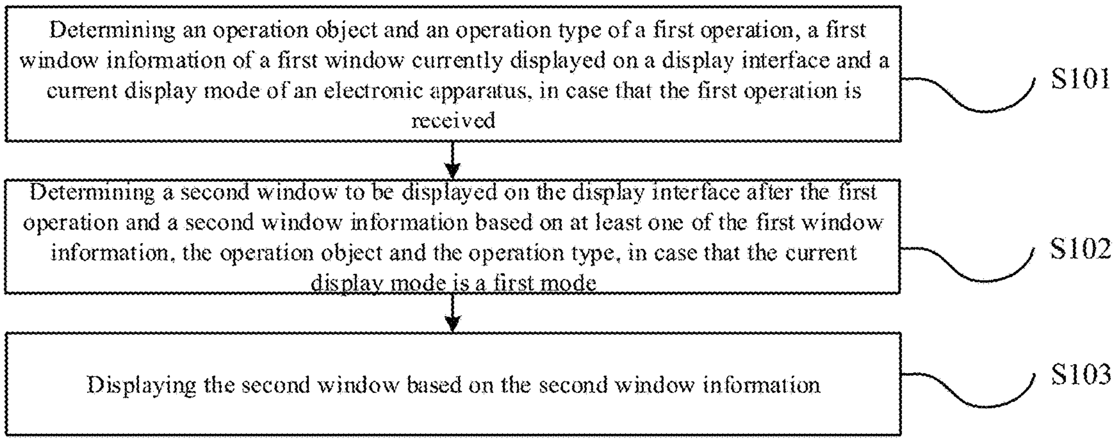
FIG. 1 is a flow chart of a control method of a display window according to a first embodiment of the present disclosure.

Hereinafter, embodiments of the present disclosure will be described in detail, examples of which are illustrated in the accompanying drawings, and the same or similar reference numerals indicate the same or similar elements or elements having the same or similar functions throughout the specification. The embodiments described below by referring to the drawings are illustrative, only for explaining the present disclosure, and cannot be understood as limiting the present disclosure. On the contrary, the embodiments of the present disclosure include all changes, modifications and equivalents that fall within the spirit and connotation of the appended claims.

It should be noted that an execution subject of a control method of a display window in embodiments may be a control device of the display window, the device may be realized by software and/or hardware, and the device may be configured in an electronic apparatus. The electronic apparatus may include, but is not limited to, large-screen terminals such as tablet computers and palm computers.

It should be noted that the process of obtaining, storing, using and processing information in the technical scheme of the present disclosure conforms to the relevant provisions of national laws and regulations, and does not violate public order and good customs.

FIG. 1 is a flow chart of a control method of a display window according to a first embodiment of the present disclosure. As shown in FIG. 1, the method includes the following steps.

At step S101, in case that a first operation is received, an operation object, an operation type, a first window information of a first window currently displayed on a display interface and a current display mode of the electronic apparatus are determined.

The first operation may be a click operation, a sliding operation or the like for a partial area in the display screen of the electronic apparatus, which is not limited here.

The operation object is an object targeted by the first operation in the electronic apparatus. The operation object may be, for example, a folder of the electronic apparatus, an application icon, a shortcut key in a status bar, a desktop display interface, or the like, which is not limited here.

Different first operations may have different operation types, and the operation type may be specifically, for example, a sliding operation type, a clicking operation type, a shortcut key operation type, a dragging operation type, or the like, which is not limited here.

A visual interface configured to show and present information to a user in the electronic apparatus is the display interface, and the display interface may be configured to display images, texts, icons, application contents and other elements.

The display window refers to a display area configured to display elements such as a specific application content, that is, the application content of a specific application may be displayed by displaying one display window by floating in the desktop display interface of the electronic apparatus, or a plurality of display windows may be displayed by floating in the desktop display interface of the electronic apparatus, so as to display the application contents of a plurality of different applications at the same time, which is not limited here.

When displaying the first window, there may be relevant display information, the relevant display information is the first window information, and the first window information may be, for example, the number of the first windows, a relative position of the first window in the display interface, and a window type of the first window (the first windows may have different window types based on their corresponding sizes, and the window type may be, for example, a small window type, a mini window type, etc.), which is not limited here.

The current display mode refers to different display settings of a current electronic apparatus for a program display interface, and may be, for example, a normal display mode, a game display mode, a night mode, etc., which is not limited here.

In the embodiments of the present disclosure, the electronic apparatus may recognize the operation object and the operation type of the first operation, as well as the first window information of the first window currently displayed on the display interface and the current display mode of the electronic apparatus in case that detecting the first operation for the partial area of the display screen.

At step S102, in case that the current display mode is a first mode, a second window to be displayed on the display interface after the first operation and a second window information are determined based on at least one of the first window information, the operation object and the operation type.

Figure 2A:
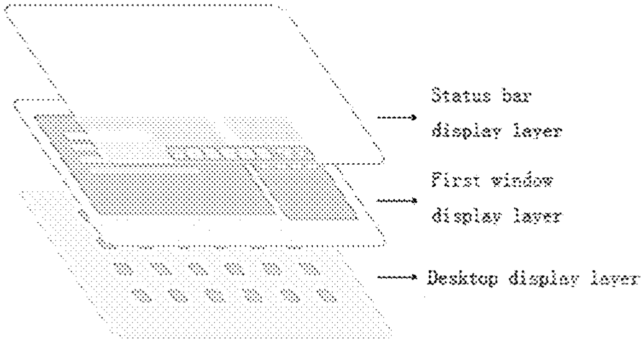
FIG. 2A is a schematic diagram of a display interface corresponding to a first mode according to an embodiment of the present disclosure.

As shown in FIG. 2A, FIG. 2A is a schematic diagram of the display interface corresponding to the first mode according to an embodiment of the present disclosure. The first mode refers to a display mode in which an initial display interface of the electronic apparatus is vertically and simultaneously divided into three layers, and the bottom layer is a desktop display layer. Usually, the desktop is empty by default, that is, shortcuts of applications may be added to the desktop from all applications. The middle layer is a first window display layer, and the upper layer is a status bar display layer. Application icons may be displayed in the status bar. At the same time, the status bar integrates the navigation function, that is, the user may enter all applications and recent tasks or clear the desktop by clicking a target control in the status bar.

In some embodiments, before determining the second window to be displayed on the display interface after the first operation and the second window information based on at least one of the first window information, the operation object and the operation type in case that the current display mode is the first mode, the current display mode may be determined as the first mode in case that it is monitored that a first mode control is selected.

When the first mode control is selected, it may be used to trigger entering the first mode. The first mode control may be set in a control interface of the electronic apparatus (that is, it may be determined that the first mode control is selected when it is monitored that the first mode control in the control interface is touched, or it may be determined that the first mode control is selected when the first mode control in the control interface is switched from an off state to an on state), or it may also be determined that the first mode control is selected when it is monitored that a preset shortcut key combination character is touched, which is not limited here.

Figure 2B:
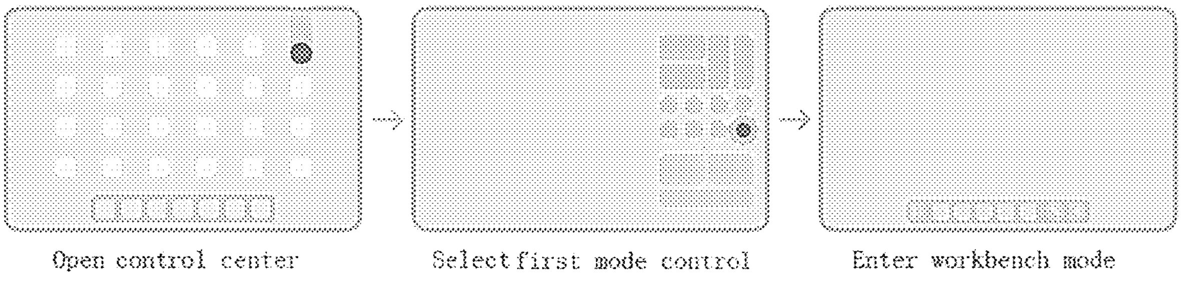
FIG. 2B is a schematic diagram of a display interface when a first mode is turned on according to an embodiment of the present disclosure.

For example, as shown in FIG. 2B, FIG. 2B is a schematic diagram of the display interface when the first mode is turned on according to an embodiment of the present disclosure, that is, the current display mode may be determined as the first mode, when the control interface of the electronic apparatus is opened in the display interface of the electronic apparatus and it is monitored that the first mode control in the control interface is selected.

After the second operation is performed on the display interface of the electronic apparatus, a new display window will be generated based on the second operation, and the new display window is a second display window. The second display window can have relevant display information, and the relevant display information is the second window information. The second window information may be specifically, for example, the number of the second windows, a relative position of the second window in the display interface, and a window type of the second window (the second windows may have different window types based on their corresponding sizes, and the window type may be, for example, a small window type, a mini window type, etc.), which is not limited here.

That is, in the embodiments of the present disclosure, after determining that the current display mode is the first mode, the second window to be displayed on the display interface after the first operation and the second window information may be determined based on at least one of the first window information, the operation object and the operation type determined above.

In some embodiments, the determining the second window to be displayed on the display interface after the first operation and the second window information based on at least one of the first window information, the operation object and the operation type, may be, determining that the second window is a first target window associated with any control, and that the second window information is a window information of the first target window in case that the operation object is any control in the status bar and the operation type is a click operation.

In combination with the above FIG. 2A, the status bar may include an application icon control and/or a target control integrated with the navigation function.

The display window associated with any control in the status bar is the first target window. The first target window may be a display window that displays application contents and is associated with application icons, or a display window that displays all applications or recent tasks and is associated with the target control, or a display window that displays a cleared desktop, which is not limited here.

That is, in the embodiments of the present disclosure, the second window may be determined as the first target window associated with any control in case that the operation object is determined to be any control in the status bar and the operation type is determined to be the click operation.

In some embodiments, in case that any control is a desktop control, the first target window is determined to be the desktop display interface in the first mode, or, in case that any control is a recent task control, the first target window is determined to be a display interface containing all application identifications that are not closed, or, in case that any control includes all application controls, the first target window is determined to be a display interface containing all application identifications in the electronic apparatus.

Figure 3A:
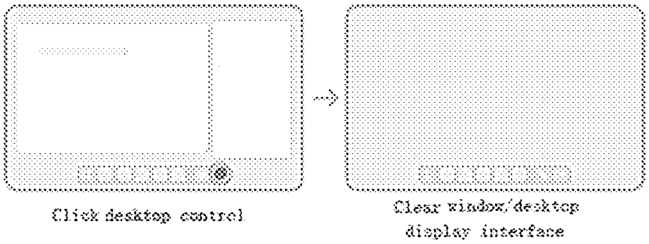
FIG. 3A is a display schematic diagram corresponding to a desktop control according to an embodiment of the present disclosure.

As shown in FIG. 3A, FIG. 3A is a display schematic diagram corresponding to the desktop control according to an embodiment of the present disclosure, that is, in case that the operation object is the desktop control in an object bar, it may be determined that the first target window is the desktop display interface in the first mode shown in FIG. 2A, i.e., when the operation object is the desktop control, all windows will be cleared, and if the display interface displayed by the current electronic apparatus displays the recent tasks or all applications, it will return to the desktop display interface in the first mode.

Figure 3B:
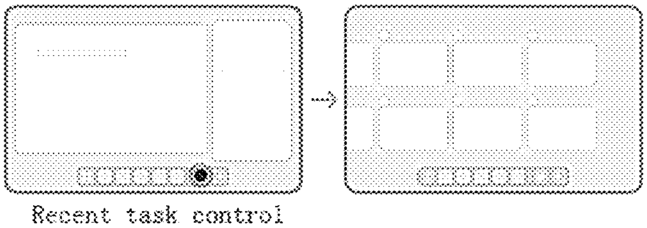
FIG. 3B is a display schematic diagram corresponding to a recent task control according to an embodiment of the present disclosure.

As shown in FIG. 3B, FIG. 3B is a display schematic diagram corresponding to the recent task control according to an embodiment of the present disclosure, that is, in case that the operation object is the recent task control in the object bar, it may be determined that the first target window is a display interface containing the recent tasks (all application identifications that are not closed).

Figure 3C:
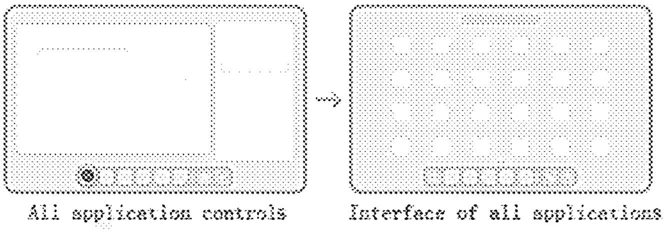
FIG. 3C is a display schematic diagram corresponding to all application controls according to an embodiment of the present disclosure.

As shown in FIG. 3C, FIG. 3C is a display schematic diagram corresponding to all application controls according to an embodiment of the present disclosure, that is, in case that the operation object includes all application controls in the object bar, it may be determined that the first target window is a display interface containing all application identifications in the electronic apparatus.

The first target window may have relevant display information, and the relevant display information is the window information of the first target window. The window information of the first target window may be, for example, the number of the first target windows, a relative position of the first target window in the display interface, and a window type of the first target window (the first target windows may have different window types based on their corresponding sizes, and the window type may be, for example, a small window type, a mini window type, etc.), which is not limited here.

That is, in the embodiments of the present disclosure, after determining that the second window is the first target window associated with any control, the window information of the first target window may be determined, and the determined window information of the first target window is determined as the second window information.

At step S103, the second window is displayed based on the second window information.

In the embodiments of the present disclosure, the second window may be displayed based on the second window information after determining the second window to be displayed on the display interface after the first operation and the second window information.

That is, in the embodiments of the present disclosure, the second window may be displayed based on a display position and/or the window type of the second window described by the second window information.

For example, the second window information is that the window type of the second window is the small window type and the display position is on a left side of the display interface, so that the second window may be displayed in the form of a small window on the left side of the display interface, which is not limited here.

In the embodiments of the present disclosure, the operation object and the operation type of the first operation, the first window information of the first window currently displayed on the display interface and the current display mode of the electronic apparatus are determined in case that the first operation is received, and the second window to be displayed on the display interface after the first operation and the second window information are determined based on at least one of the first window information, the operation object and the operation type in case that the current display mode is the first mode. Further, based on the second window information, the second window is displayed. Thus, the combined display and the fast switching display of the plurality of applications in the electronic apparatus can be realized, thus effectively meeting the linkage use requirements of the plurality of applications.

Figure 4:
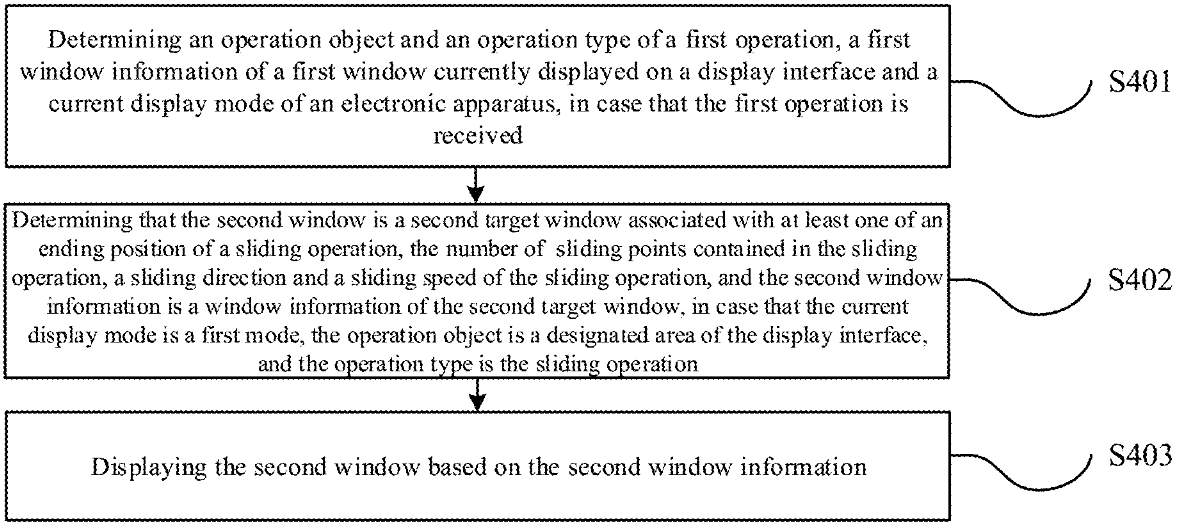
FIG. 4 is a flow chart of a control method of a display window according to a second embodiment of the present disclosure.

FIG. 4 is a flow chart of a control method of a display window according to a second embodiment of the present disclosure. As shown in FIG. 4, the method includes the following steps.

At step S401, in case that a first operation is received, an operation object, an operation type, a first window information of a first window currently displayed on a display interface and a current display mode of an electronic apparatus are determined.

For the description of step S401, reference may be made to the above embodiment, which will not be repeated here.

At step S402, in case that the current display mode is a first mode, the operation object is a designated area of the display interface, and the operation type is a sliding operation, it is determined that a second window is a second target window associated with at least one of an ending position of the sliding operation, the number of sliding points contained in the sliding operation, a sliding direction and a sliding speed of the sliding operation, and a second window information is a window information of the second target window.

The designated area may be a local display interface preset for the display interface, and the designated area may be a bottom area of the display interface, a left area of the display interface, etc., which is not limited here.

The sliding operation may be, for example, sliding from the top to the bottom of the display interface, sliding from the bottom to the top of the display interface, sliding from the bottom area of the display interface to a designated position and stopping, a sliding operation with a single sliding point (i.e., a single-finger sliding operation), a sliding operation with a plurality of sliding points (e.g., a grabbing sliding operation with four fingers from edges of the display interface to a center point of the display interface, a four-finger horizontal sliding operation, etc.), which is not limited here.

Figure 5A:
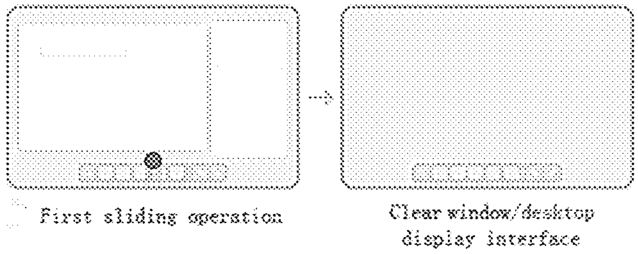
FIG. 5A is a display schematic diagram corresponding to a first sliding operation according to an embodiment of the present disclosure.

For example, as shown in FIG. 5A, FIG. 5A is a display schematic diagram corresponding to the first sliding operation according to an embodiment of the present disclosure, the first sliding operation may be, for example, a sliding operation in which the number of the sliding points is 1, the sliding direction is from the top to the bottom of the display interface without sliding ending, and the sliding speed is greater than or equal to a sliding speed threshold. It is determined that the second target window associated with the first sliding operation is the desktop display interface in the first mode shown in FIG. 2A, that is, when the operation object is a desktop control, all windows will be cleared, and if the display interface displayed by the current electronic apparatus displays recent tasks or all applications, it will return to a desktop display interface in the first mode.

Figure 5B:
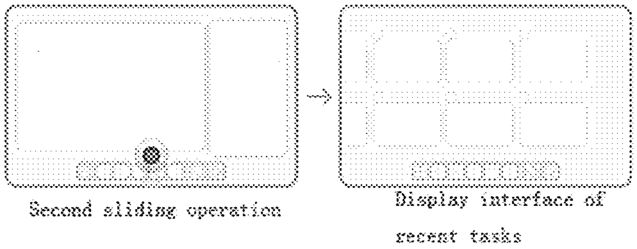
FIG. 5B is a display schematic diagram corresponding to a second sliding operation according to an embodiment of the present disclosure.

For example, as shown in FIG. 5B, FIG. 5B is a display schematic diagram corresponding to a second sliding operation according to an embodiment of the present disclosure. The second sliding operation may be, for example, a sliding operation in which the number of the sliding points is 1, and the sliding direction is from the top to the bottom of the display interface with sliding ending (i.e., it is determined that the second sliding operation has a corresponding ending position), and it is determined that the second target window associated with the above second sliding operation is a display interface containing the recent tasks (all application identifications that are not closed).

Figure 5C:
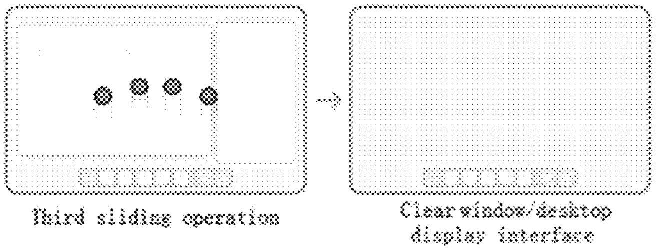
FIG. 5C is a display schematic diagram corresponding to a third sliding operation according to an embodiment of the present disclosure.

For example, as shown in FIG. 5C, FIG. 5C is a display schematic diagram corresponding to a third sliding operation according to an embodiment of the present disclosure. The third sliding operation may be, for example, a sliding operation in which the number of the sliding points is 4, and the sliding direction is from the top to the bottom of the display interface without sliding ending (that is, it is determined that the third sliding operation does not have a corresponding ending position), and it is determined that the second target window associated with the above third sliding operation is the desktop display interface in the first mode shown in FIG. 2A, that is, all windows will be cleared, and if the display interface displayed by the current electronic apparatus displays the recent tasks or all applications, it will return to the desktop display interface in the first mode.

Figure 5D:
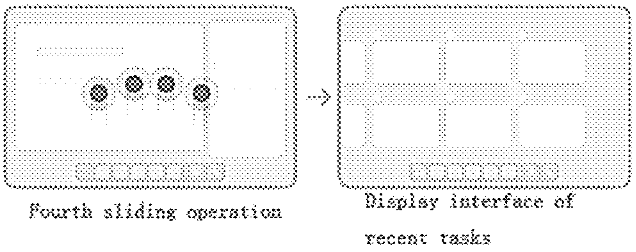
FIG. 5D is a display schematic diagram corresponding to a fourth sliding operation according to an embodiment of the present disclosure.

For example, as shown in FIG. 5D, FIG. 5D is a display schematic diagram corresponding to a fourth sliding operation according to an embodiment of the present disclosure, the fourth sliding operation may be, for example, a sliding operation in which the number of the sliding points is 4, and the sliding direction is from the top to the bottom of the display interface with sliding ending (i.e., it is determined that the fourth sliding operation has a corresponding ending position), and it is determined that the second target window associated with the above fourth sliding operation is the display interface containing the recent tasks (all application identifications that are not closed).

Figure 5E:
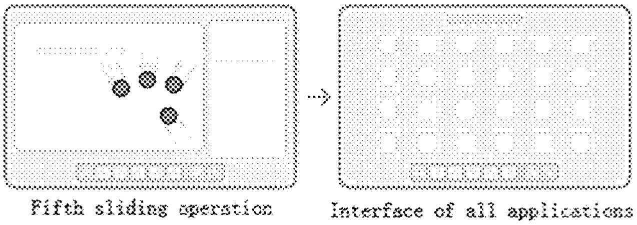
FIG. 5E is a display schematic diagram corresponding to a fifth sliding operation according to an embodiment of the present disclosure.

For example, as shown in FIG. 5E, FIG. 5E is a display schematic diagram corresponding to a fifth sliding operation according to an embodiment of the present disclosure. The fifth sliding operation may be, for example, a sliding operation in which the number of the sliding points is 4, and the sliding direction is from the periphery of the display interface to the center point of the display interface without sliding ending (i.e., it is determined that the fifth sliding operation does not have a corresponding ending position), and it is determined that the second target window associated with the above fifth sliding operation is a display interface containing all application identifications in the electronic apparatus.

It should be noted that the first sliding operation, the second sliding operation, the third sliding operation, the fourth sliding operation and the fifth sliding operation described above are only illustrative examples of the embodiments of the present disclosure, and the sliding operation may also be freely configured based on at least one of the ending position of the sliding operation, the number of the sliding points contained in the sliding operation, the sliding direction and the sliding speed of the sliding operation, which is not limited here.

That is, in the embodiments of the present disclosure, in case that the current display mode is the first mode, the operation object is the designated area of the display interface, and the operation type is the sliding operation, a target sliding operation may be determined based on at least one of the ending position of the sliding operation, the number of the sliding points contained in the sliding operation, the sliding direction and the sliding speed of the sliding operation, and then the second target window associated with the target sliding operation may be determined.

The second target window may have relevant display information, and the relevant display information is the window information of the second target window. The window information of the second target window may be specifically, for example, the number of the second target windows, a relative position of the second target window in the display interface, and a window type of the second target window (the second target windows may have different window types based on their corresponding sizes, and the window type may be, for example, a small window type, a mini window type, etc.), which is not limited here.

That is, in the embodiments of the present disclosure, after determining that the second window is the second target window associated with the target sliding operation, the window information of the second target window may be determined, and the determined window information of the second target window may be taken as the second window information.

At step S403, the second window is displayed based on the second window information.

For the description of step S403, reference may be made to the above embodiments, which will not be repeated here.

In the embodiments of the present disclosure, in case that the first operation is received, the operation object and the operation type of the first operation, the first window information of the first window currently displayed on the display interface and the current display mode of the electronic apparatus, and in case that the current display mode is the first mode, the operation object is the designated area of the display interface, and the operation type is the sliding operation, it is determined that the second window is the second target window associated with at least one of the ending position of the sliding operation, the number of the sliding points contained in the sliding operation, the sliding direction and the sliding speed of the sliding operation, and the second window information is the window information of the second target window. Further, based on the second window information, the second window is displayed. Thus, the corresponding second display window can be flexibly triggered and displayed based on at least one of the ending position of the sliding operation, the number of sliding points contained in the sliding operation, the sliding direction and the sliding speed of the sliding operation of the sliding operation, thus effectively improving the convenience of the combined display and the fast switching display of a plurality of applications.

Figure 6:
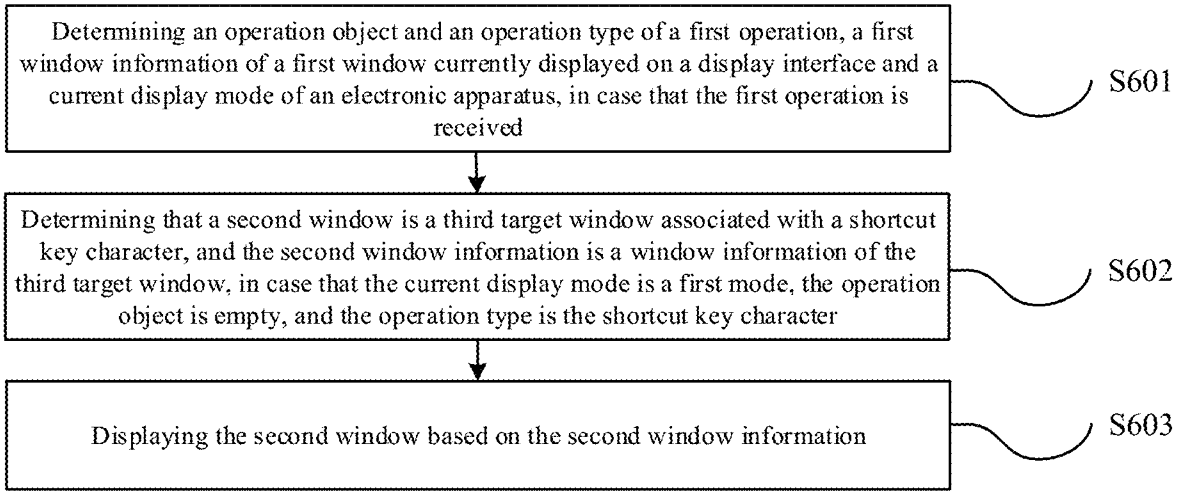
FIG. 6 is a flow chart of a control method of a display window according to a third embodiment of the present disclosure.

FIG. 6 is a flow chart of a control method of a display window according to a third embodiment of the present disclosure. As shown in FIG. 6, the method includes the following steps.

At step S601, in case that a first operation is received, an operation object and an operation type of the first operation, a first window information of a first window currently displayed on a display interface and a current display mode of an electronic apparatus are determined.

For the description of S601, reference may be made to the above embodiments, which will not be repeated here.

At step S602, in case that the current display mode is a first mode, the operation object is empty, and the operation type is a shortcut key character, it is determined that a second window is a third target window associated with the shortcut key character, and a second window information is a window information of the third target window.

In the embodiments of the present disclosure, the electronic apparatus may be externally connected with a Bluetooth keyboard, so that the generation of the third target window to be displayed may be triggered based on the external Bluetooth keyboard in case that the operation object is empty (that is, the display interface of the electronic apparatus has not received any operation).

The shortcut key character may be a character preset for a key character in the keyboard, and the shortcut key character may be any character in the keyboard or a random combination of a plurality of characters in the keyboard, which is not limited here.

Figure 7A:
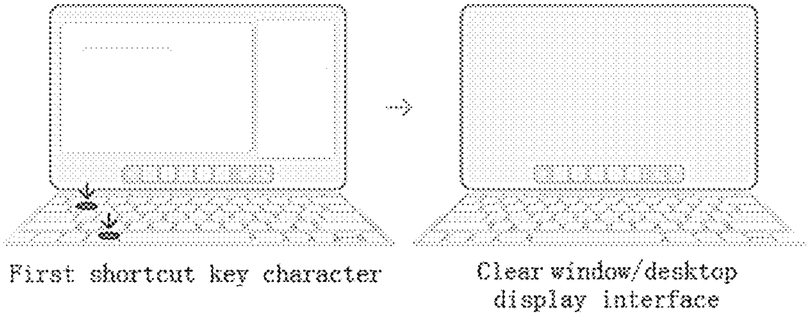
FIG. 7A is a display schematic diagram corresponding to a first shortcut key character according to an embodiment of the present disclosure.

For example, as shown in FIG. 7A, FIG. 7A is a display schematic diagram corresponding to a first shortcut key character according to an embodiment of the present disclosure. The first shortcut key character may be, for example, a combination form of Ctrl+Q in the keyboard, that is, when it is monitored that Ctrl+Q is pressed in the keyboard, it is determined that the third target window associated with the first shortcut key character is the desktop display interface in the first mode shown in FIG. 2A, that is, all windows will be cleared, and if the display interface displayed by the current electronic apparatus shows the recent tasks or all applications, it will return to the desktop display interface in the first mode.

Figure 7B:
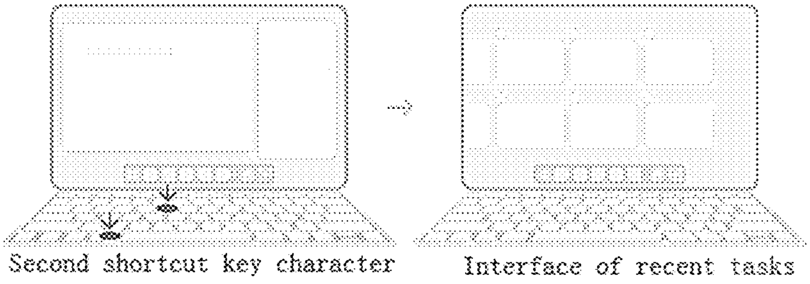
FIG. 7B is a display schematic diagram corresponding to a second shortcut key character according to an embodiment of the present disclosure.

For example, as shown in FIG. 7B, FIG. 7B is a display schematic diagram corresponding to a second shortcut key character according to an embodiment of the present disclosure, the second shortcut key character may be, for example, a combination form of Ctrl+T in the keyboard, that is, when it is monitored that Ctrl+T is pressed in the keyboard, it is determined that the third target window associated with the second shortcut key character is a display interface containing the recent tasks (all application identifications that are not closed).

Figure 7C:
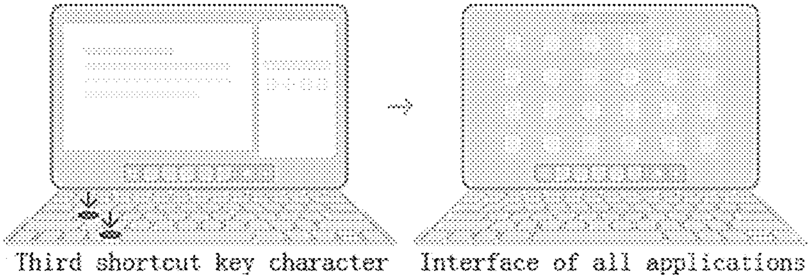
FIG. 7C is a display schematic diagram corresponding to a third shortcut key character according to an embodiment of the present disclosure.

For example, as shown in FIG. 7C, FIG. 7C is a display schematic diagram corresponding to a third shortcut key character according to an embodiment of the present disclosure, the third shortcut key character may be, for example, a combination form of Ctrl+T in the keyboard, that is, when it is monitored that Ctrl+T is pressed in the keyboard, it is determined that the third target window associated with the third shortcut key character is a display interface containing all application identifications in the electronic apparatus.

The third target window may have relevant display information, and the relevant display information is the window information of the third target window. The window information of the third target window may be specifically, for example, the number of the third target windows, a relative position of the third target window in the display interface, and a window type of the third target window (the third target windows may have different window types based on theirs corresponding sizes, and the window type may be, for example, a small window type, a mini window type, etc.), which is not limited here.

That is, in the embodiments of the present disclosure, after determining that the second window is the third target window associated with the shortcut key character, the window information of the third target window may be determined, and the determined window information of the third target window is taken as the second window information.

At step S603, the second window is displayed based on the second window information.

For the description of S603, reference may be made to the above embodiments, which will not be repeated here.

In the embodiments of the present disclosure, in case that the first operation is received, the operation object and the operation type of the first operation, the first window information of the first window currently displayed on the display interface and the current display mode of the electronic apparatus are determined, and in case that the current display mode is the first mode, the operation object is empty and the operation type is the shortcut key character, it is determined that the second window is the third target window associated with the shortcut key character and the second window information is the window information of the third target window. Further, the second window is displayed based on the second window information. Thus, the corresponding second display window can be flexibly triggered and displayed based on the shortcut key character operation in the external keyboard of the electronic apparatus, thus effectively improving the convenience of the combined display and the quick switching display of the plurality of applications.

Figure 8:
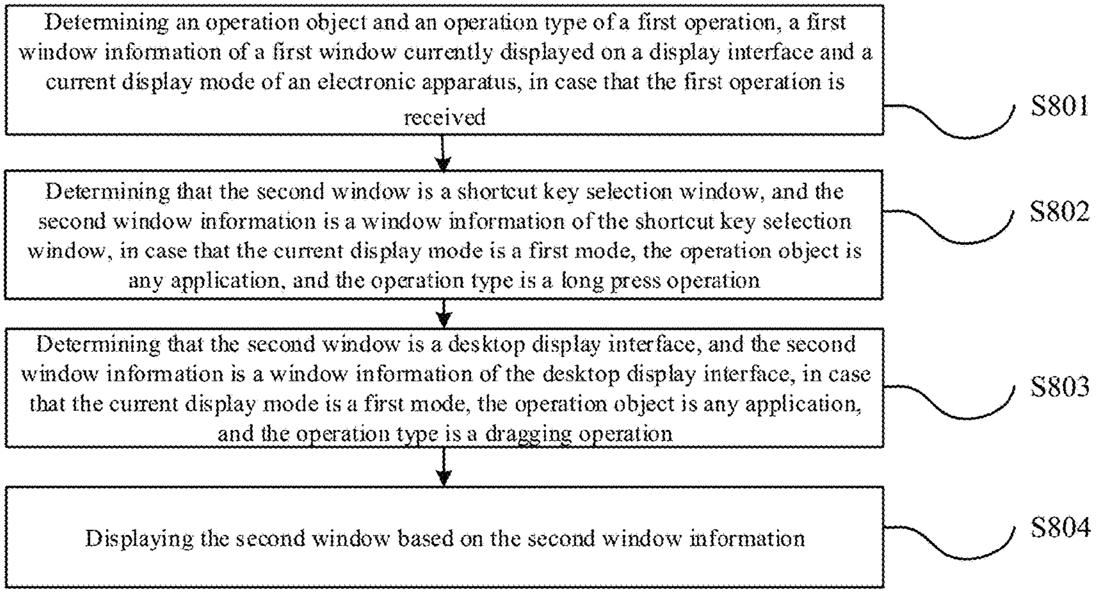
FIG. 8 is a flow chart of a control method of a display window according to a fourth embodiment of the present disclosure.

FIG. 8 is a flow chart of a control method of a display window according to a fourth embodiment of the present disclosure. As shown in FIG. 8, the method includes the following steps.

At step S801, in case that a first operation is received, an operation object and an operation type of the first operation, a first window information of a first window currently displayed on a display interface and a current display mode of the electronic apparatus are determined.

For the description of step S801, reference may be made to the above embodiments, which will not be repeated here.

At step S802, in case that a current display mode is a first mode, the operation object is any application, and the operation type is a long press operation, it is determined that a second window is a shortcut key selection window, and a second window information is a window information of the shortcut key selection window.

The long press operation may be, for example, determining that a duration of any application control receiving a touch instruction is longer than a duration threshold.

The shortcut key selection window may be, for example, a shortcut key selection menu, and the shortcut of the application may be added to the desktop by selecting a corresponding control in the shortcut key selection menu.

Figure 9A:
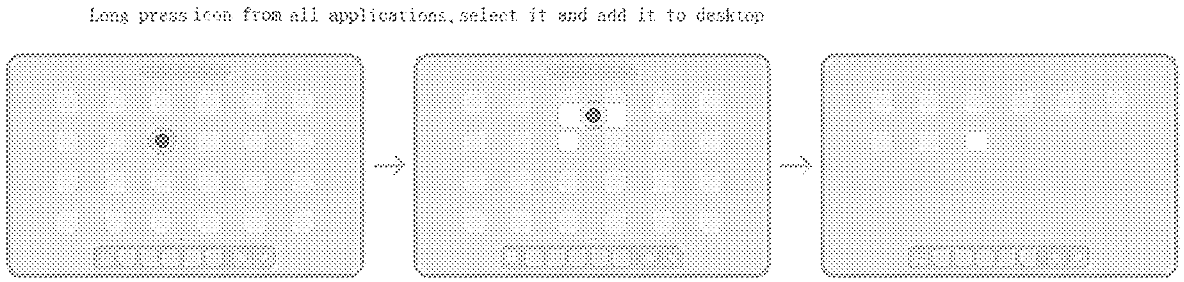
FIG. 9A is a display schematic diagram corresponding to an application long press operation according to an embodiment of the present disclosure.

That is, in the embodiments of the present disclosure, referring to FIG. 9A, FIG. 9A is a display schematic diagram corresponding to an application long press operation according to an embodiment of the present disclosure, that is, in case that the current display mode is the first mode, the operation object is any application, the duration of the control receiving the touch instruction is determined, and the duration of receiving the touch instruction is greater than the duration threshold, it is determined that the second window is the shortcut key selection window.

The shortcut key selection window may have relevant window information, and the relevant window information may be specifically, for example, a relative position of the shortcut key selection window in the display interface, a window type of the shortcut key selection window (the shortcut key selection windows may have different window types based on their corresponding sizes, and the window type may be, for example, a small window type, a mini window type, etc.), and the content information displayed by the shortcut key selection window, etc., which is not limited here.

That is, in the embodiments of the present disclosure, after determining that the second window is the shortcut key selection window, the window information of the shortcut key selection window may be determined, and the window information of the shortcut key selection window is taken as the second window information.

At step S803, in case that the current display mode is the first mode, the operation object is any application, and the operation type is a dragging operation, it is determined that the second window is a desktop display interface, and the second window information is a window information of the desktop display interface.

The dragging operation for any application may be, for example, monitoring that an application control receives the touch instruction, and the duration of receiving the touch instruction is greater than the duration threshold, and monitoring that the application control is moved (for example, monitoring that the application control is moved from a position to another position in the display desktop, which is not limited here).

Figure 9B:
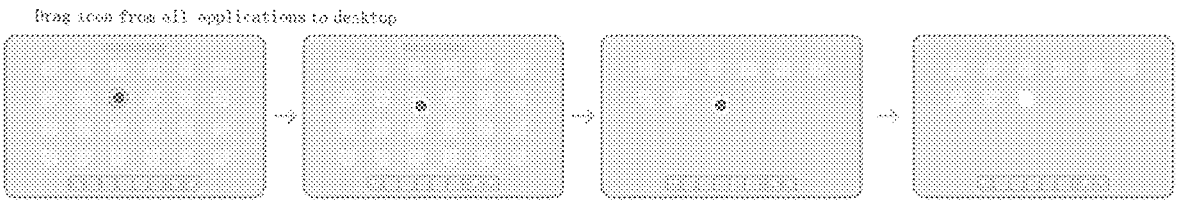
FIG. 9B is a display schematic diagram corresponding to an application dragging operation according to an embodiment of the present disclosure.

In the embodiments of the present disclosure, referring to FIG. 9B, FIG. 9B is a display schematic diagram corresponding to an application dragging operation according to an embodiment of the present disclosure, that is, it may be determined that the second window is the desktop display interface, in case that the current display mode is the first mode, the operation object is any application, and the operation type is the dragging operation.

The desktop display interface may have relevant window information, and the relevant window information may be specifically, for example, a relative position of the desktop display interface in the display interface, a window type of the desktop display interface (the desktop display interfaces may have different window types based on their corresponding sizes, and the window type may be, for example, a small window type, a mini window type, etc.), the content information displayed by the desktop display interface, etc., which is not limited here.

That is, in the embodiments of the present disclosure, it may be determined that the second window is the desktop display interface, the window information of the desktop display interface may be determined, and the window information of the desktop display interface may be determined as the second window information.

At step S804, based on the second window information, the second window is displayed.

For the description of S804, reference may be made to the above embodiments, which will not be repeated here.

In the embodiments of the present disclosure, in case that the first operation is received, the operation object and the operation type of the first operation, the first window information of the first window currently displayed on the display interface and the current display mode of the electronic apparatus are determined, in case that the current display mode is the first mode, the operation object is any application and the operation type is the long press operation, it is determined that the second window is the shortcut key selection window and the second window information is the window information of the shortcut key selection window, and in case that the current display mode is the first mode, the operation object is any application, and the operation type is the dragging operation, it is determined that the second window is the desktop display interface, and the second window information is the window information of the desktop display interface. Further, the second window is displayed based on the second window information. Thus, the shortcut key selection window can be triggered and displayed based on the long press operation for any application, and the desktop display interface can be triggered and displayed based on the dragging operation for any application, thus effectively meeting the diversified interface switching display requirements of the user, and hence effectively improving the user experience.

Figure 10:
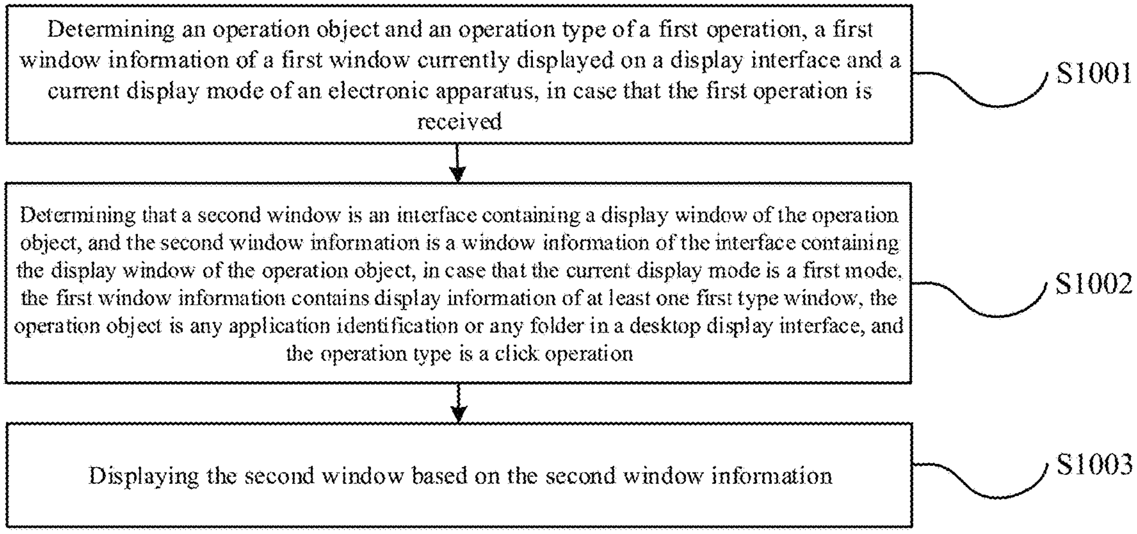
FIG. 10 is a flow chart of a control method of a display window according to a sixth embodiment of the present disclosure.

FIG. 10 is a flow chart of a control method of a display window according to a sixth embodiment of the present disclosure. As shown in FIG. 10, the method includes the following steps.

At step S1001, in case that a first operation is received, an operation object and an operation type of the first operation, a first window information of a first window currently displayed on a display interface and a current display mode of an electronic apparatus are determined.

For the description of S1001, reference may be made to the above embodiments, which will not be repeated here.

At step S1002, in case that the current display mode is a first mode, the first window information contains a display information of at least one first type window, the operation object is any application identification or any folder in the desktop display interface, and the operation type is a click operation, it is determined that the second window is an interface containing a display window of the operation object, and the second window information is a window information of the interface containing the display window of the operation object.

The second window corresponding to the at least one first type window after the first operation is a second type window, and a window size of the second type window is smaller than that of the first type window.

The display windows may have different window types based on the sizes of the display windows, and the window type of the display window may be specifically, for example, a small window type and an edge-adjacent small window type, and the window size of the display window of the edge-adjacent small window type is smaller than the window size of the display window of the small window type.

The first type window may be, for example, a small window type window, and the second type window may be, for example, an edge-adjacent small window type window, which is not limited here.

Figure 11A:
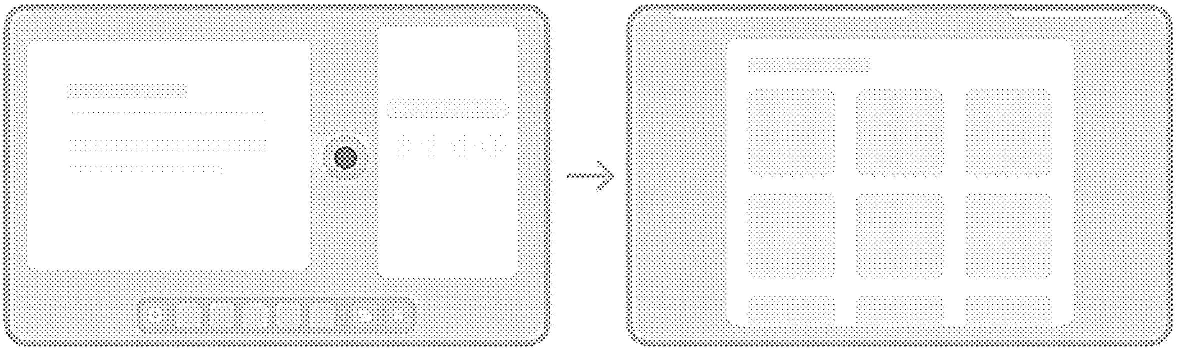
FIG. 11A is a display schematic diagram corresponding to a first click operation according to an embodiment of the present disclosure.

In the embodiments of the present disclosure, referring to FIG. 11A, FIG. 11A is a display schematic diagram corresponding to a first click operation according to an embodiment of the present disclosure, the first click operation refers to clicking any application identification in the desktop display interface in case that the current display mode is the first mode and the first window information contains the display information of at least one first type window, that is, when the operation object is any application identification in the desktop display interface, the first type window will be displayed adjacent to the edge (that is, the second window corresponding to the at least one first type window after the first operation is the second type window), so that the display of the display window corresponding to the application identification will not be affected, thus effectively improving the display effect of the display window corresponding to the application identification and facilitating the subsequent operation of the user on the display window corresponding to the application identification.

Figure 11B:
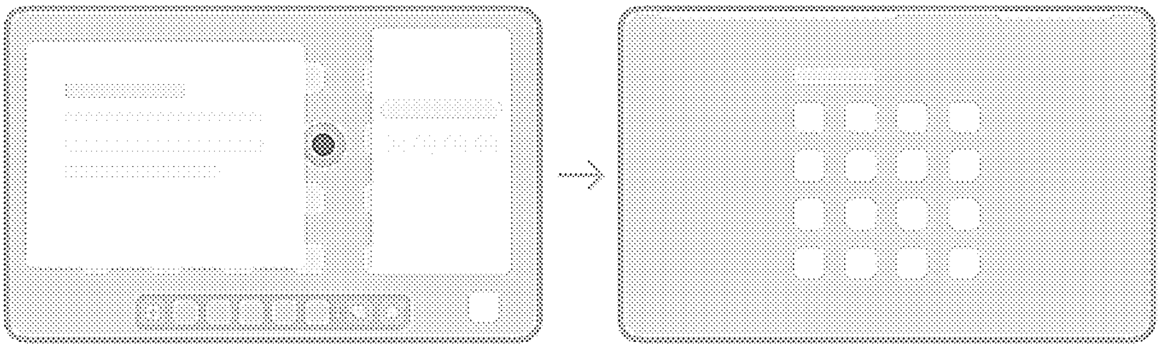
FIG. 11B is a display schematic diagram corresponding to a second click operation according to an embodiment of the present disclosure.

In the embodiments of the present disclosure, referring to FIG. 11B, FIG. 11B is a display schematic diagram corresponding to a second click operation according to an embodiment of the present disclosure, the second click operation refers to clicking any folder in the desktop display interface in case that the current display mode is the first mode and the first window information contains a display information of at least one first type window, that is, when the operation object is any folder in the desktop display interface, the first type window will be displayed adjacent to the edge (that is, the second window corresponding to the at least one first type window after the first operation is a second type window), so that the display of the display window corresponding to the folder will not be affected, thus effectively improving the display effect of the display window corresponding to the folder and facilitating the subsequent operation of the user on the display window corresponding to the folder.

The interface containing the display window of the operation object may have relevant window information, and the relevant window information may be specifically, for example, a relative position of the interface containing the display window of the operation object in the display interface, a window type of the interface containing the display window of the operation object (the desktop display interfaces may have different window types based on their corresponding sizes, and the window type may be, for example, a small window type, a mini window type, etc.), and the content information displayed by the interface containing the display window of the operation object, which is not limited here.

That is, in the embodiments of the present disclosure, when it is determined that the second window is the interface containing the display window of the operation object, the window information of the interface containing the display window of the operation object may be determined, and the window information of the interface containing the display window of the operation object may be determined as the second window information.

At step S1003, the second window is displayed based on the second window information.

For the description of S1003, reference may be made to the above embodiments, which will not be repeated here.

In the embodiments of the present disclosure, in case that the first operation is received, the operation object and the operation type of the first operation, the first window information of the first window currently displayed on the display interface and the current display mode of the electronic apparatus are determined, and in case that the current display mode is the first mode, the first window information contains the display information of the at least one first type window, the operation object is any application identification or any folder in the desktop display interface, and the operation type is the click operation, it is determined that the second window is the interface containing the display window of the operation object, and the second window information is the window information of the interface containing the display window of the operation object. Further, the second window is displayed based on the second window information. Therefore, the display of the display window corresponding to the application identification will not be affected, thus effectively improving the display effect of the display window corresponding to the application identification, and facilitating the subsequent operation of the user on the display window corresponding to the application identification. Or, the display of the display window corresponding to the folder will not be affected, thus effectively improving the display effect of the display window corresponding to the folder and facilitating the subsequent operation of the user on the display window corresponding to the folder.

Figure 12:
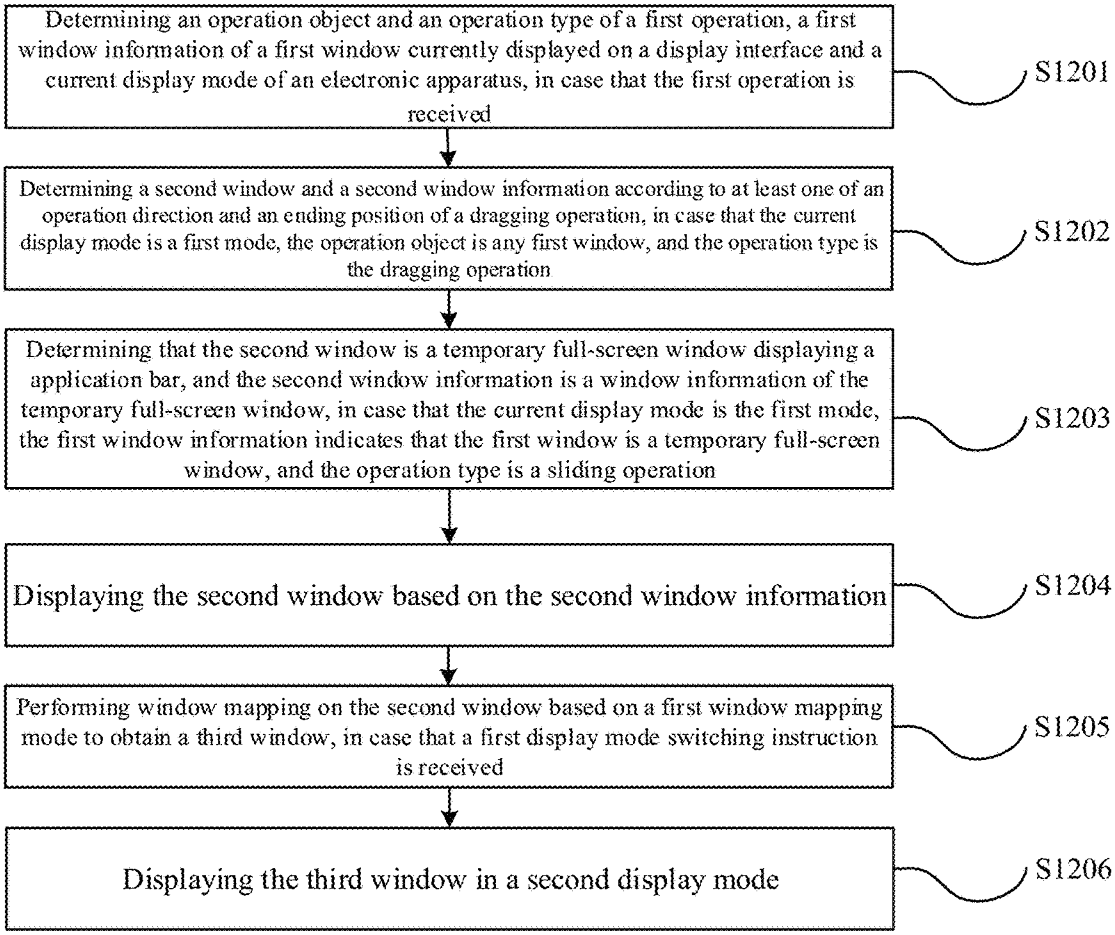
FIG. 12 is a flow chart of a control method of a display window according to a seventh embodiment of the present disclosure.

FIG. 12 is a flow chart of a control method of a display window according to a seventh embodiment of the present disclosure. As shown in FIG. 12, the method includes the following steps.

At step S1201, in case that a first operation is received, an operation object and an operation type of the first operation, a first window information of a first window currently displayed on a display interface and a current display mode of an electronic apparatus are determined.

In some embodiments, before the first operation is received, a second display mode switching instruction may be received. The second display mode switching instruction is used to instruct the display mode of the electronic apparatus to switch from a second display mode to a first display mode, and perform window mapping on a fourth window in the display interface based on a second window mapping mode, so as to obtain the first window.

The second display mode switching instruction is used for instructing the display mode of the electronic apparatus to switch from a normal mode to a workbench mode.

Figure 13A:
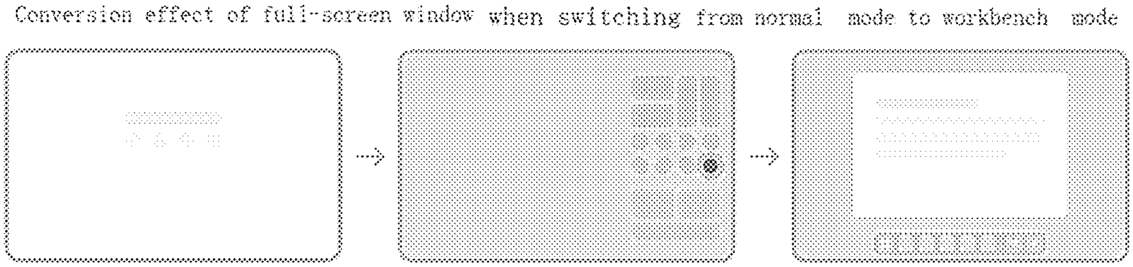
FIG. 13A is a schematic diagram of a conversion effect of a full-screen type window when switching from a normal mode to a workbench mode according to an embodiment of the present disclosure.
Figure 13B:
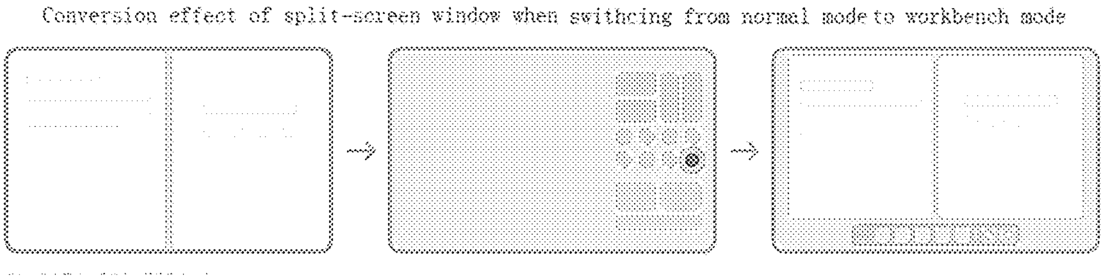
FIG. 13B is a schematic diagram of a conversion effect of a split-screen type window when switching from a normal mode to a workbench mode according to an embodiment of the present disclosure.
Figure 13C:
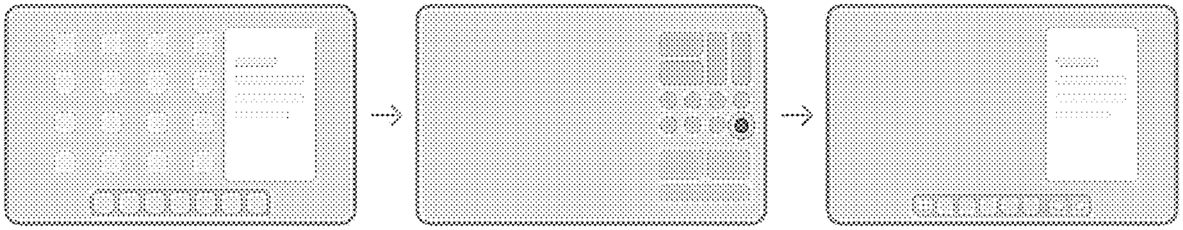
FIG. 13C is a schematic diagram of a conversion effect of a small window type window when switching from a normal mode to a workbench mode according to an embodiment of the present disclosure.
Figure 13D:
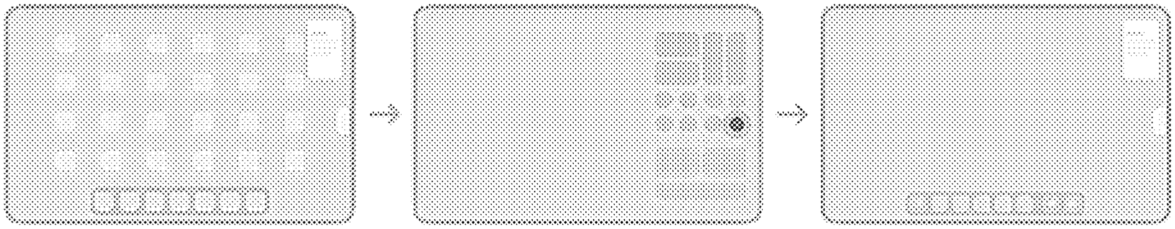
FIG. 13D is a schematic diagram of a conversion effect of a window when switching from a normal mode to a workbench mode according to an embodiment of the present disclosure.

In the embodiments of the present disclosure, referring to FIG. 13A, FIG. 13A is a schematic diagram of a conversion effect of a full-screen type window when switching from the normal mode to the workbench mode according to an embodiment of the present disclosure. That is, when switching from the normal mode to the workbench mode, the full-screen type window is converted into a small window type window. As shown in FIG. 13B, FIG. 13B is a schematic diagram of a conversion effect of a split-screen type window when switching from the normal mode to the workbench mode according to an embodiment of the present disclosure. That is, when switching from the normal mode to the workbench mode, the split-screen type window is converted into a small window type window. As shown in FIG. 13C, FIG. 13C is a schematic diagram of a conversion effect of the small window type window when switching from the normal mode to the workbench mode according to an embodiment of the present disclosure. That is, when switching from the normal mode to the workbench mode, the small window type window remains unchanged. As shown in FIG. 13D, FIG. 13D is a schematic diagram of a conversion effect of a window when switching from the normal mode to the workbench mode according to an embodiment of the present disclosure. That is, when switching from the normal mode to the workbench mode, the recently used small window type window will be converted into the full-screen type window, a mini window type window and an edge-adjacent type window will remain unchanged, and other types of windows will be closed.

Referring to the above examples, when switching the display mode of the electronic apparatus from the normal mode to the workbench mode, if window type changes are involved, it is necessary to perform the window mapping on the fourth window based on the second window mapping mode so as to obtain the first window, and the window types of the fourth window and the first window are different.

The second window mapping mode may be, for example, proportional mapping (determining a proportion closest to the fourth window and mapping the fourth display window based on this proportion), size mapping (determining a value closest to a diagonal of the fourth window and performing the window mapping on the fourth window based on this value), and position mapping (determining a coordinate of a center point of the fourth display window and performing the window mapping on the fourth window based on this value, that is, the center points of the mapped third window and the fourth window are the same), which is not limited here.

At step S1202, in case that the current display mode is a first mode, the operation object is any first window, and the operation type is a dragging operation, a second window and a second window information are determined according to at least one of an operation direction and an ending position of the dragging operation.

Figure 13E:
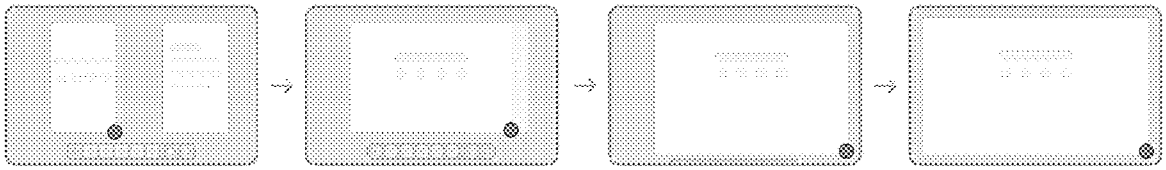
FIG. 13E is a display schematic diagram of dragging a small window type window to a temporary full screen according to an embodiment of the present disclosure.

In the embodiments of the present disclosure, referring to FIG. 13E, FIG. 13E is a display schematic diagram of dragging a small window type window to a temporary full screen according to an embodiment of the present disclosure, that is, for example, when a dragging direction is towards a right side of the display interface, it may be determined that the second window is a larger window after sequentially expanding the small window type window, and the relevant window information of the expanded larger window may be taken as the second window information.

Figure 13F:
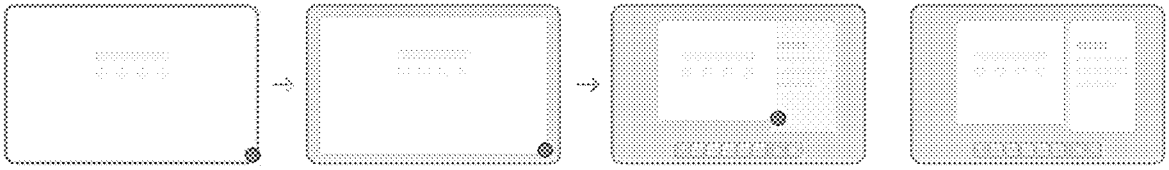
FIG. 13F is a display schematic diagram of dragging a full-screen type window to a small window type window according to an embodiment of the present disclosure.

In the embodiments of the present disclosure, referring to FIG. 13F, FIG. 13F is a display schematic diagram of dragging a full-screen type window to a small window type window according to an embodiment of the present disclosure, that is, when the edge of the full-screen window receives the dragging operation, it may be determined that the second window is a smaller window after the full-screen type window is shrunk in sequence according to the ending position of the dragging, and the relevant window information of the shrunk smaller window is taken as the second window information.

At step S1203, in case that the current display mode is the first mode, and the first window information indicates that the first window is a temporary full-screen window, and the operation type is a sliding operation, it is determined that the second window is a temporary full-screen window displaying an application bar, and the second window information is a window information of the temporary full-screen window.

Figure 13G:
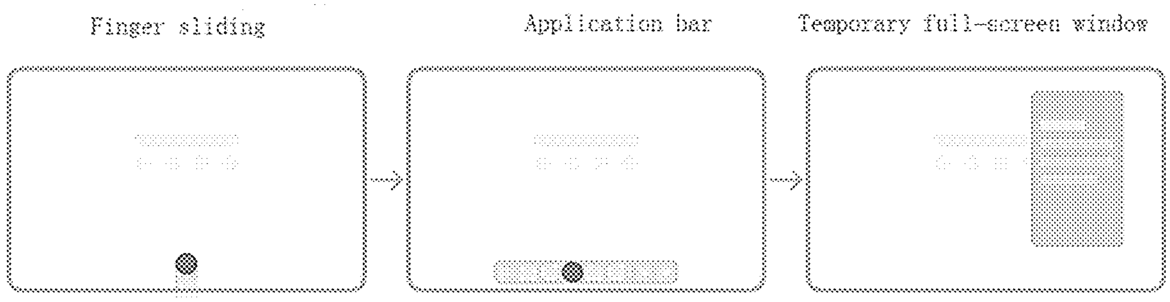
FIG. 13G is a display schematic diagram corresponding to finger sliding according to an embodiment of the present disclosure.
Figure 13H:
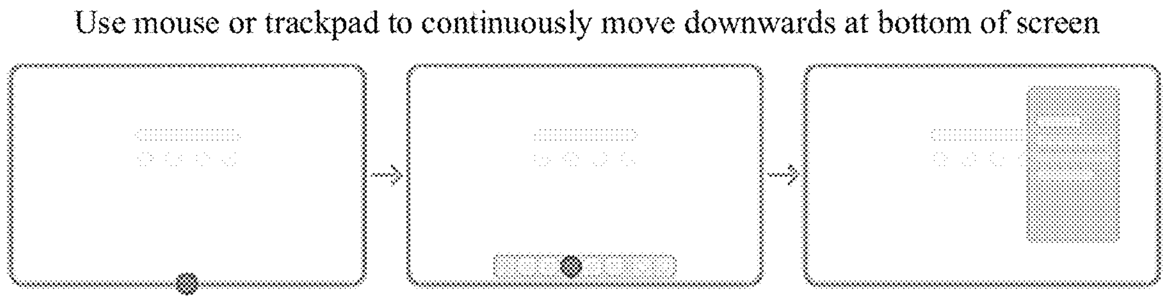
FIG. 13H is a display schematic diagram corresponding to mouse or stylus sliding according to an embodiment of the present disclosure.

In the embodiments of this disclosure, referring to FIG. 13G and FIG. 13H, FIG. 13G is a display schematic diagram corresponding to finger sliding according to an embodiment of this disclosure, and FIG. 13H is a display schematic diagram corresponding to mouse or stylus sliding according to an embodiment of this disclosure, that is, in case that the current display mode is the first mode, the first window information indicates that the first window is the temporary full-screen window, and the operation type is the sliding operation, it is determined that the second window is the temporary full-screen window displaying the application bar. For example, the user may slide upwards from the bottom of the display interface to display the application bar, and then may click any application in the application bar, to display the display content corresponding to the application in the temporary full-screen window.

The temporary full-screen window displaying the application bar may have relevant window information, and the relevant window information may be specifically, for example, a relative position of the temporary full-screen window displaying the application bar in the display interface, a window type of the temporary full-screen window displaying the application bar (the desktop display interfaces may have different window types based on their corresponding sizes, and the window type may be, for example, a small window type, a mini window type, etc.), and the content information displayed by the temporary full-screen window displaying the application bar, which is not limited here.

That is, in the embodiments of the present disclosure, it may be determined that the second window is the temporary full-screen window displaying the application bar, the window information of the temporary full-screen window displaying the application bar is determined, and the window information of the temporary full-screen window displaying the application bar is determined as the second window information.

At step S1204, the second window is displayed based on the second window information.

For the description of step S1204, reference may be made to the above embodiments, which will not be repeated here.

At step S1205, in case that a first display mode switching instruction is received, window mapping is performed on the second window based on a first window mapping mode to obtain a third window.

The first display mode switching instruction may be used to trigger the electronic apparatus to switch from the workbench mode to the normal mode, and then continue to trigger the electronic apparatus to switch from the normal mode to the workbench mode.

Figure 13I:
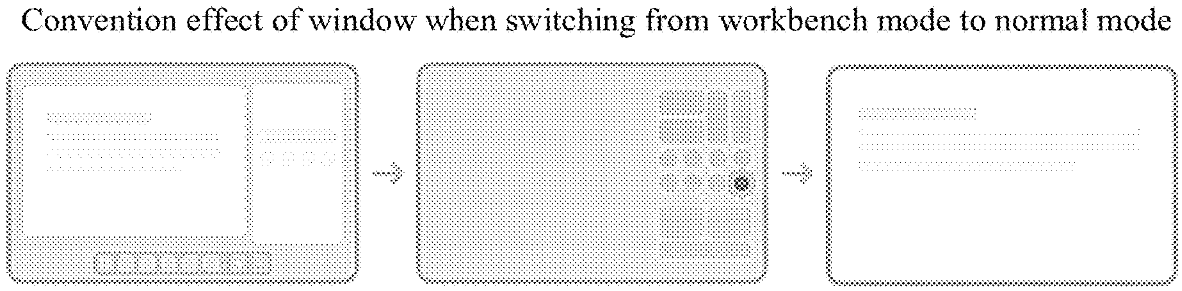
FIG. 13I is a schematic diagram of a conversion effect of a window when switching from a workbench mode to a normal mode according to an embodiment of the present disclosure.

In the embodiments of the present disclosure, referring to FIG. 13I, FIG. 13I is a schematic diagram of a conversion effect of a window when switching from the workbench mode to the normal mode according to an embodiment of the present disclosure, that is, when switching from the workbench mode to the normal mode, the recently used small window type window will be converted into a full-screen type window, the mini window type window and the edge-adjacent type window will remain unchanged, and other types of windows will be closed.

Referring to the above examples, when the display mode is switched and the window type is changed, it is necessary to perform the window mapping on the second window based on the first window mapping mode to obtain the third window, and the window types of the third window and the second window are different.

The first window mapping mode may be, for example, proportional mapping (determining a proportion closest to the second window and mapping the second display window based on this proportion), size mapping (determining a value closest to a diagonal of the second window and performing the window mapping on the second window based on this value), and position mapping (determining a coordinate of a center point of the second display window and performing the window mapping on the second window based on this value, that is, the center points of the mapped third window and the second window are the same), which is not limited here.

At step S1206, the third window is displayed in the second display mode.

In the embodiments of the present disclosure, in case that the first display mode switching instruction is received, the window mapping is performed on the second window based on the first window mapping mode to obtain the third window, and then the third display window may be displayed in the second display mode, so that when the display mode is switched and the display window is currently displayed in the display interface, the display mode switching can be achieved without affecting the use of the user's current task, thus effectively improving the user experience.

In the embodiments of the present disclosure, in case that the first operation is received, the operation object and the operation type of the first operation, the first window information of the first window currently displayed on the display interface and the current display mode of the electronic apparatus are determined, and in case that the operation object is any first window and the operation type is the dragging operation, the second window and the second window information are determined according to at least one of the operation direction and the ending position of the dragging operation, and in case that the first window information indicates that the first window is the temporary full-screen window and the operation type is the sliding operation, it is determined that the second window is the temporary full-screen window displaying the application bar and the second window information is the window information of the temporary full-screen window, and the second window is displayed based on the second window information, so that the combined display and the fast switching display of the plurality of applications in the electronic apparatus can be realized, thus effectively meeting the linkage use requirements of the plurality of applications. In case that the first display mode switching instruction is received, the window mapping is performed on the second window based on the first window mapping mode to obtain the third window, and then the third window is displayed in the second display mode, so that when the display mode is switched and the display window is currently displayed in the display interface, the display mode switching can be achieved without affecting the use of the user's current task, thus effectively improving the user experience.

Figure 14:
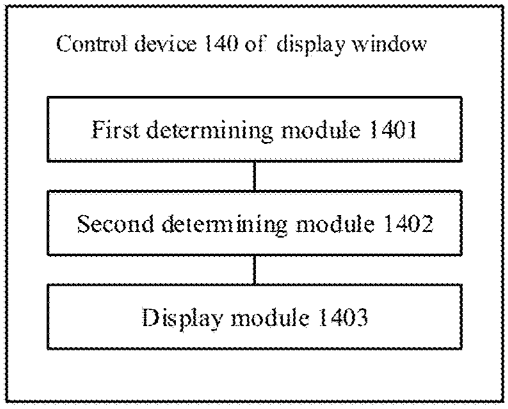
FIG. 14 is a block diagram of a control device of a display window according to an embodiment of the present disclosure.

FIG. 14 is a block diagram of a control device of a display window according to the present disclosure. As shown in FIG. 14, the control device 140 of the display window includes: a first determining module 1401, configured to determine an operation object and an operation type of a first operation, a first window information of a first window currently displayed on a display interface and a current display mode of an electronic apparatus in case that the first operation is received; a second determining module 1402, configured to determine a second window to be displayed on the display interface after the first operation and a second window information based on at least one of the first window information, the operation object and the operation type in case that the current display mode is a first mode; and a display module 1403, configured to display the second window based on the second window information.

In some embodiments of the present disclosure, the second determining module 1402 is further configured to determine that the second window is a first target window associated with any control, and the second window information is a window information of the first target window in case that the operation object is any control in a status bar and the operation type is a click operation.

In some embodiments of the present disclosure, the second determining module 1402 is further configured to: determine that the first target window is a desktop display interface in the first mode in case that any control is a desktop control; or, determine that the first target window is a display interface containing all application identifications that are not closed in case that any control is a recent task control; or, determine that the first target window is a display interface containing all application identifications in the electronic apparatus in case that any control includes all application controls.

In some embodiments of the present disclosure, the second determining module 1402 is further configured to determine that the second window is a second target window associated with at least one of an ending position of a sliding operation, the number of sliding points contained in the sliding operation, a sliding direction and a sliding speed of the sliding operation, and the second window information is a window information of the second target window, in case that the operation object is a designated area of the display interface and the operation type is the sliding operation.

In some embodiments of the present disclosure, the second determining module 1402 is further configured to determine that the second window is a third target window associated with a shortcut key character, and the second window information is a window information of the third target window, in case that the operation object is empty and the operation type is the shortcut key character.

In some embodiments of the present disclosure, the second determining module 1402 is further configured to: determine that the second window is a shortcut key selection window and the second window information is a window information of the shortcut key selection window in case that the operation object is any application and the operation type is a long press operation, or, determine that the second window is the desktop display interface and the second window information is a window information of the desktop display interface, in case that the operation object is any application and the operation type is a dragging operation.

In some embodiments of the present disclosure, the second determining module 1402 is further configured to: determine that the second window is an interface containing a display window of the operation object, and the second window information is a window information of the interface containing the display window of the operation object, in case that the first window information contains a display information of at least one first type window, and the operation object is any application identification or any folder in the desktop display interface, and the operation type is a click operation. The second window corresponding to the at least one first type window after the first operation is a second type window, and a window size of the second type window is smaller than a window size of the first type window.

In some embodiments of the present disclosure, the second determining module 1402 is further configured to determine the second window and the second window information according to at least one of an operation direction and an ending position of a dragging operation in case that the operation object is any first window and the operation type is the dragging operation.

In some embodiments of the present disclosure, the second determining module 1402 is further configured to determine that the second window is a temporary full-screen window displaying an application bar, and the second window information is a window information of the temporary full-screen window in case that the first window information indicates that the first window is the temporary full-screen window and the operation type is a sliding operation.

In some embodiments of the present disclosure, the display module 1403 is further configured to: perform window mapping on the second window based on a first window mapping mode after displaying the second window to obtain a third window, in case that a first display mode switching instruction is received; and display the third window in a second display mode.

In some embodiments of the present disclosure, the first determining module 1401 is further configured to: receive a second display mode switching instruction before receiving the first operation, in which the second display mode switching instruction is used for instructing a display mode of the electronic apparatus to switch from the second display mode to the first display mode; and perform window mapping on a fourth window in the display interface to obtain the first window based on a second window mapping mode.

In some embodiments of the present disclosure, the second determining module 1402 is further configured to determine that the current display mode is the first mode in case that it is monitored that a first mode control is selected, before determining the second window to be displayed on the display interface after the first operation and the second window information based on at least one of the first window information, the operation object and the operation type in case that the current display mode is the first mode.

In some embodiments of the present disclosure, the display interface corresponding to the first mode includes a status bar display layer, a first window display layer and a desktop display layer.

In the embodiments of the present disclosure, in case that the first operation is received, the operation object and the operation type of the first operation, the first window information of the first window currently displayed on the display interface and the current display mode of the electronic apparatus are determined, and in case that the current display mode is the first mode, the second window to be displayed on the display interface after the first operation and the second window information are determined based on at least one of the first window information, the operation object and the operation type. Further, based on the second window information, the second window is displayed, which can realize the combined display and the fast switching display of the plurality of applications in the electronic apparatus, thus effectively meeting the linkage use requirements of the plurality of applications.

According to an embodiment of the present disclosure, the present disclosure also provides an electronic apparatus, a computer-readable storage medium and a computer program product.

Figure 15:
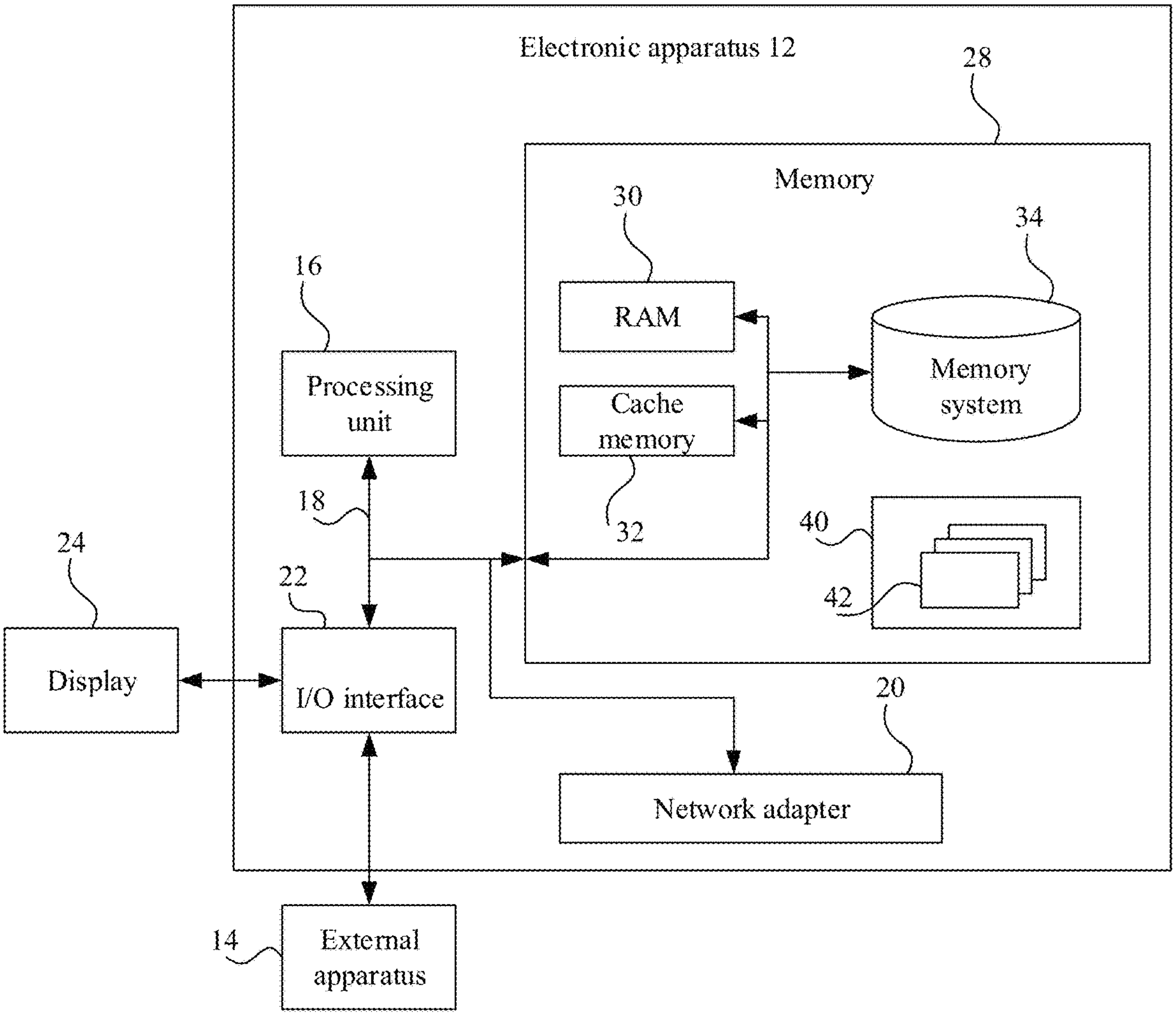
FIG. 15 shows a block diagram of an illustrative electronic apparatus suitable for implementing embodiments of the present disclosure.

FIG. 15 shows a block diagram of an illustrative electronic apparatus suitable for implementing embodiments of the present disclosure.

An electronic apparatus 12 shown in FIG. 15 is just an example, and should not bring any limitation to the function and application scope of the embodiments of the present disclosure.

As shown in FIG. 15, the electronic apparatus 12 is expressed in the form of a general-purpose computing apparatus. Components of the electronic apparatus 12 may include, but are not limited to, one or more processors or processing units 16, a memory 28, and a bus 18 connecting different system components (including the memory 28 and the processing unit 16).

The bus 18 represents one or more of several types of bus structures, including a memory bus or a memory controller, a peripheral bus, a graphics acceleration port, a processor, or a local bus using any of a variety of bus structures. For example, these architectures include, but are not limited to, industry standard architecture (Hereinafter referred to as ISA) bus, microchannel architecture (Hereinafter referred to as MAC) bus, enhanced ISA bus, video electronics standards association (Hereinafter referred to as VESA) local bus and peripheral component interconnection (Hereinafter referred to as PCI) bus.

The electronic apparatus 12 typically includes a variety of computer system readable media. These media may be any available media that can be accessed by the electronic apparatus 12, including volatile and non-volatile media, removable and non-removable media.

The memory 28 may include a computer system readable medium in the form of the volatile memory, such as a random access memory (Hereinafter referred to as RAM) 30 and/or a cache memory 32. The electronic apparatus 12 may further include other removable/non-removable, volatile/nonvolatile computer system storage media. By way of example only, the storage system 34 may be used to read from and write to non-removable, non-volatile magnetic media (not shown in FIG. 15, commonly referred to as a "hard disk drive").

Although not shown in FIG. 15, a disk drive for reading from and writing to a removable non-volatile disk (e.g., "a floppy disk") and a compact disk drive for reading from and writing to a removable non-volatile compact disk (e.g., Compact Disc Read Only Memory, hereinafter referred to as CD-ROM, a Digital Video Disc Read Only Memory, hereinafter referred to as DVD-ROM or other optical media). In these cases, each drive may be connected to the bus 18 through one or more data medium interfaces. The memory 28 may include at least one program product having a set of (e.g., at least one) program modules configured to perform the functions of embodiments of the present disclosure.

A program/utility 40 with a set of (at least one) program modules 42 may be stored in the memory 28, for example. Such program modules 42 include, but are not limited to, an operating system, one or more application programs, other program modules and program data, and each or some combination of these examples may include the implementation of a network environment. The program modules 42 generally perform the functions and/or methods in the embodiments described in the present disclosure.

The electronic apparatus 12 may also communicate with one or more external apparatuses 14 (e.g., a keyboard, a pointing apparatus, a display 24, etc.), and may also communicate with one or more apparatuses that enable the human body to interact with the electronic apparatus 12, and/or with any apparatus (e.g., a network card, a modem, etc.) that enables the electronic apparatus 12 to communicate with one or more other computing apparatuses. This communication may be achieved through an input/output (I/O) interface 22. Furthermore, the electronic apparatus 12 may also communicate with one or more networks (e.g., Local Area Network, hereinafter referred to as LAN, Wide Area Network, hereinafter referred to as WAN and/or a public network, such as the Internet). As shown in the drawings, the network adapter 20 communicates with other modules of the electronic apparatus 12 through the bus 18. It should be understood that although not shown in the drawings, other hardware and/or software modules may be used in conjunction with the electronic apparatus 12, including but not limited to microcode, apparatus drivers, redundant processing units, external disk drive arrays, RAID systems, tape drives, data backup storage systems, and the like.

By running the program stored in the memory 28, the processing unit 16 executes various functional applications and parameter information determination, for example, the control method of the service display window described in the previous embodiments or the service data acquisition method described in the previous embodiments.

It should be noted that in the description of the present disclosure, the terms "first" and "second" are only used for description purposes, and cannot be understood as indicating or implying relative importance. In addition, in the description of the present disclosure, unless otherwise specified, "a plurality of" means two or more.

Any process or method description in the flow chart or otherwise described herein may be understood as representing a module, segment or part of code that includes one or more executable instructions for implementing specific logical functions or steps of the process, and the scope of preferred embodiments of the present disclosure includes other implementations, in which functions may be performed out of the order shown or discussed, including in a substantially simultaneous manner or in the reverse order according to the functions involved, which should be understood by those skilled in the technical field to which the embodiments of the present disclosure belong.

It should be understood that various parts of the present disclosure may be implemented in hardware, software, firmware, or a combination thereof. In the above embodiments, a plurality of steps or methods may be realized by software or firmware stored in a memory and executed by an appropriate instruction execution system. For example, if it is implemented in hardware, as in another embodiment, it may be implemented by any one of the following technologies or their combination: a discrete logic circuit with a logic gate for implementing a logic function on a data signal, an application specific integrated circuit with a suitable combinational logic gate, a programmable gate array (PGA), a field programmable gate array (FPGA), and the like.

Those skilled in the art may understand that all or part of the steps carried by the method of the above embodiments may be completed by instructing related hardware through a program, which may be stored in a computer-readable storage medium, and when executed, the program includes one or a combination of the steps of the method embodiment.

In addition, each functional unit in each embodiment of the present disclosure may be integrated in one processing module, or each unit may exist physically alone, or two or more units may be integrated in one module. The above integrated modules may be realized in the form of hardware or software functional modules. The integrated module may also be stored in a computer-readable storage medium if it is implemented in the form of a software functional module and sold or used as an independent product.

The storage medium mentioned above may be read-only memory, magnetic disk or optical disk, etc.

In the description of this specification, descriptions referring to the terms "an embodiment", "some embodiments", "examples", "specific examples" or "some examples" mean that specific features, structures, materials or characteristics described in connection with the embodiment or example are included in at least one embodiment or example of this disclosure. In this specification, the schematic expressions of the above terms do not necessarily refer to the same embodiment or example. Moreover, the specific features, structures, materials or characteristics described may be combined in any one or more embodiments or examples in a suitable manner.

Although the embodiments of the present disclosure have been shown and described above, it can be understood that the above embodiments are illustrative and cannot be understood as limitations of the present disclosure, and those skilled in the art can make changes, modifications, substitutions and variations to the above embodiments within the scope of the present disclosure.

What is claimed is:

1. A control method of a display window, comprising:

receiving a first operation;

in response to receiving the first operation, determining an operation object and an operation type of the first operation, a first window information of a first window currently displayed on a display interface and a current display mode of an electronic apparatus;

in response to the current display mode being a first mode, determining a second window to be displayed on the display interface after the first operation and a second window information based on at least one of the first window information, the operation object and the operation type; and displaying the second window based on the second window information;

wherein the determining the second window to be displayed on the display interface after the first operation and the second window information based on at least one of the first window information, the operation object and the operation type comprises:

in response to the first window information indicating that the first window is a temporary full-screen window and the operation type is a sliding operation, determining that the second window is a temporary full-screen window displaying an application bar and the second window information is a window information of the temporary full-screen window displaying the application bar;

wherein after displaying the second window, the method further comprises:

receiving a first display mode switching instruction;

in response to receiving the first display mode switching instruction, performing window mapping on the second window based on a first window mapping mode to obtain a third window; and displaying the third window in a second display mode.

2. The method according to claim 1, wherein the determining the second window to be displayed on the display interface after the first operation and the second window information based on at least one of the first window information, the operation object and the operation type comprises:

in response to the operation object being a designated area of the display interface and the operation type being the sliding operation, determining that the second window is a second target window associated with at least one of an ending position of the sliding operation, a number of sliding points contained in the sliding operation, a sliding direction and a sliding speed of the sliding operation, and the second window information is a window information of the second target window.

3. The method according to claim 1, wherein before receiving the first operation, the method further comprises:

receiving a second display mode switching instruction, wherein the second display mode switching instruction is configured for instructing a display mode of the electronic apparatus to switch from a second display mode to a first display mode; and performing window mapping on a fourth window in the display interface based on a second window mapping mode to obtain the first window.

4. The method according to claim 1, wherein before determining the second window to be displayed on the display interface after the first operation and the second window information based on at least one of the first window information, the operation object and the operation type, in response to the current display mode being the first mode, the method further comprises:

determining that the current display mode is the first mode in response to monitoring that a first mode control is selected.

5. The method according to claim 1, wherein the display interface corresponding to the first mode comprises:

a status bar display layer, a first window display layer and a desktop display layer.

6. An electronic apparatus, comprising:

a processor; and a memory for storing instructions executable by the processor, wherein the processor is configured to:

receive a first operation;

in response to receiving the first operation, determine an operation object and an operation type of the first operation, a first window information of a first window currently displayed on a display interface and a current display mode of an electronic apparatus;

in response to the current display mode being a first mode, determine a second window to be displayed on the display interface after the first operation and a second window information based on at least one of the first window information, the operation object and the operation type; and display the second window based on the second window information;

wherein the determining the second window to be displayed on the display interface after the first operation and the second window information based on at least one of the first window information, the operation object and the operation type comprises:

in response to the first window information indicating that the first window is a temporary full-screen window and the operation type is a sliding operation, determining that the second window is a temporary full-screen window displaying an application bar and the second window information is a window information of the temporary full-screen window displaying the application bar;

wherein after displaying the second window, the processor is further configured to:

receive a first display mode switching instruction;

in response to receiving the first display mode switching instruction, perform window mapping on the second window based on a first window mapping mode to obtain a third window; and display the third window in a second display mode.

7. The electronic apparatus according to claim 6, wherein the processor is further configured to:

in response to the operation object being a designated area of the display interface and the operation type being the sliding operation, determine that the second window is a second target window associated with at least one of an ending position of the sliding operation, a number of sliding points contained in the sliding operation, a sliding direction and a sliding speed of the sliding operation, and the second window information is a window information of the second target window.

8. A non-transitory computer-readable storage medium, wherein in case that instructions in the computer-readable storage medium are executed by a processor of an electronic apparatus, the computer-readable storage medium enables the electronic apparatus to:

receive a first operation;

in response to receiving the first operation, determine an operation object and an operation type of the first operation, a first window information of a first window currently displayed on a display interface and a current display mode of an electronic apparatus;

in response to the current display mode being a first mode, determine a second window to be displayed on the display interface after the first operation and a second window information based on at least one of the first window information, the operation object and the operation type; and display the second window based on the second window information;

wherein in case that the instructions in the computer-readable storage medium are executed by the processor of the electronic apparatus, the computer-readable storage medium enables the electronic apparatus further to:

in response to the first window information indicating that the first window is a temporary full-screen window and the operation type is a sliding operation, determine that the second window is a temporary full-screen window displaying an application bar and the second window information is a window information of the temporary full-screen window displaying the application bar;

wherein after displaying the second window, the computer-readable storage medium enables the electronic apparatus further to:

receive a first display mode switching instruction;

in response to receiving the first display mode switching instruction, perform window mapping on the second window based on a first window mapping mode to obtain a third window; and display the third window in a second display mode.

* * * * *